United States Patent

[11] 3,570,514

| [72] | Inventors | Trevor G. Sutton<br>Tempe;<br>Donald W. Chapin, Scottsdale, Ariz. |
|---|---|---|
| [21] | Appl. No. | 760,154 |
| [22] | Filed | Sept. 17, 1968 |
| [45] | Patented | Mar. 16, 1971 |
| [73] | Assignee | The Garrett Corporation<br>Los Angeles, Calif. |

[54] FLUIDIC CHARACTERISTIC SENSOR
8 Claims, 7 Drawing Figs.

| [52] | U.S. Cl. | 137/81.5 |
|---|---|---|
| [51] | Int. Cl. | F15c 1/12 |
| [50] | Field of Search | 137/81.5 |

[56] References Cited
UNITED STATES PATENTS

| 3,292,648 | 12/1966 | Colston | 137/81.5 |
|---|---|---|---|
| 3,302,398 | 2/1967 | Taplin et al. | 137/81.5X |
| 3,339,571 | 9/1967 | Hatch, Jr. | 137/81.5 |
| 3,348,562 | 10/1967 | Ogren | 137/81.5 |
| 3,398,758 | 8/1968 | Linfried | 137/81.5 |
| 3,409,032 | 11/1968 | Boothe et al | 137/81.5X |
| 3,428,067 | 2/1969 | Dexter et al. | 137/81.5 |
| 3,458,129 | 7/1969 | Woodson | 137/81.5X |
| 3,461,898 | 8/1969 | Bellman et al. | 137/81.5 |
| 3,467,125 | 9/1969 | Dexter | 137/81.5 |

*Primary Examiner*—Samuel Scott
*Attorneys*—Herschel C. Omohundro and John N. Hazelwood ABSTRACT: The subject system is provided to sense changes in a selected characteristic such as temperature, pressure, humidity, etc., in a localized region. The system utilizes fluidic principles which are characterized by the absence of moving parts. The illustrated system includes means for generating pulsating signals at a frequency bearing some relation to the characteristic being sensed. These pulsating signals are supplied through resonant transmission lines, including delay means, to amplifiers of the beam diode type, the transmission lines and diodes being designed to shift the frequency phase and amplitude to produce signals with a varying amplitude, proportional to the frequency of the original signals. The amplitude modulated signals are then supplied to filter elements where the mean DC level of the signals is extracted and fed to an amplifier for summing and amplification to the desired pressure output.

Patented March 16, 1971        3,570,514

INVENTORS.
TREVOR G. SUTTON
DONALD W. CHAPIN

BY

*Herschel C Omohundro*

ATTORNEY

Patented March 16, 1971 3,570,514

OUTPUT OF DIODE

EFFECT OF FILTER

INVENTORS.
TREVOR G. SUTTON
DONALD W. CHAPIN
BY
*Herschel C. Omohundro*
ATTORNEY

FLUIDIC CHARACTERISTIC SENSOR

SUMMARY

This invention relates to the fluidic art and is more particularly directed to the provision of a system for sensing characteristic of a localized region. The particular characteristic selected for illustration is temperature, but it should be understood at the outset that the system is applicable to other characteristics such as motion, pressure, humidity, etc., without departing from the principles of the invention. The primary objective is to provide a fluidic sensor system which will generate pulsating signals having a frequency bearing some relation to the characteristic being sensed. These pulsating signals are then converted to amplitude and phase variations which are ultimately converted to pressure, the overall effect being a conversion from the sensed characteristic to a pressure force of a sensitivity sufficient to perform a useful function.

Another object is to provide a fluidic system suitable for use in sensing temperature in a localized region, the system having a fluidic oscillator comprising a digital amplifier and a sensing line exposed to the temperature in the selected region, the sensing line being connected with the control ports of the amplifier and responsive to said temperature, thus providing a path for low pressure pulses to travel between the control ports at a predetermined frequency bearing a known relationship to the temperature in the sensing line. The frequency of the pulses is determined by the sonic velocity in the sensing tube and is proportional to the square root of the temperature in the tube. These pulses serve to switch the beam of the oscillator and cause the latter to produce output signals with a frequency which is a function of the temperature. The signals are subjected to treatment in means which shifts the phase of the frequency and modulates the amplitude in accordance with the frequency. As phase shifted and amplitude modulated, the signals are then filtered in suitable means to select the means or average level which is then passed through summing and amplification means to provide the required pressure output.

A further object of the invention is to provide the system mentioned in the preceding paragraph with signal treating means having transmission lines with predetermined resonant and attenuating characteristics which will change the frequency phase and modulate the amplitude of the signals to secure the optimum gain.

A still further object of the invention is to provide the system mentioned in the two preceding paragraphs with fluidic beam diode devices to which the phase and amplitude modified signals are applied to control fluid jet beams, preferably from a source of increased pressure, whereby pulsating signals of amplified force but still bearing a relation to the frequency of the original pulsating signals will be produced.

An object also is to provide the systems suggested in the preceding paragraphs with filtering means consisting of passages with chambers or resonant cavities of different capacities communicating therewith at spaced points, such filters serving, in a sense, as capacitors whereby the higher parts or peaks of the pulsating signals will be transferred to the lower parts or valleys between such peaks and a smoother signal substantially equal to the mean or average of the alternating pulses will result.

Other objects and advantages will be apparent from the following description of one embodiment of the invention selected for illustration in the accompanying drawing.

THE DRAWINGS

Figure 1:
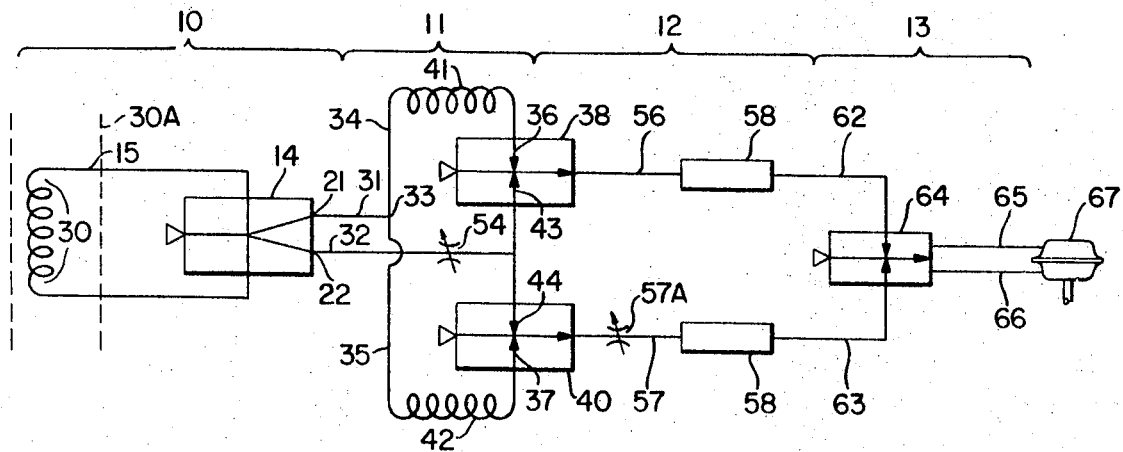
FIG. 1 is a schematic view of a temperature sensing system embodying the features of the present invention.

To attain the objectives set forth above, the fluidic system schematically set forth in FIG. 1 has been provided. This system is composed generally of four sections, 10—13, inclusive; section 10 being a frequency generator section; section 11 is a resonator section; section 12 constitutes a rectifier section; and section 13 is an amplifier section.

Figure 2:
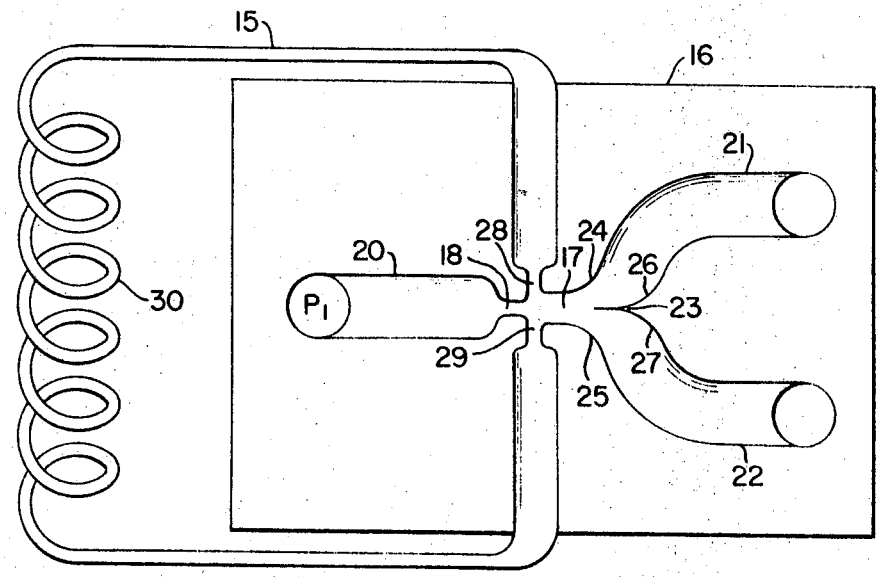
FIG. 2 is a schematic view in greater detail of a sonic oscillator or pulse generator forming a part of the system shown in FIG. 1.

The frequency generator section has a digital amplifier 14 and a sensing tube 15, these elements forming an oscillator of the sonic type shown schematically on a larger scale in FIG. 2. The amplifier portion of the oscillator has a planar body 16 of predetermined thickness and flat top and bottom walls (not shown). The body 16 is provided with a chamber 17 to which an inlet jet nozzle 18 supplies fluid under pressure from a suitable source to form a fluid beam. Nozzle 18 is connected with the fluid pressure source by a passage 20. A pair of output ports 21 and 22 also communicate with the chamber 17, a divider or beam splitter 23 being disposed substantially in alignment with the nozzle 18 at the opposite side of the chamber 17. The chamber 17 is formed by diverging sidewalls 24 and 25 each of which forms one side of one or the other of the output ports, the diverging walls 26 and 27 of the divider 23 forming the opposite walls of the output ports. On opposite sides of the nozzle 18 the body 16 is provided with control ports 28 and 29, these ports communicating with the opposite ends of the sensing line 15. The sensing line is of a predetermined length and diameter and has a portion 30 intermediate its length disposed within a duct or other region 30A in which the characteristic to be sensed obtains. In the present instance, as previously pointed out, the characteristic being sensed is temperature, the portion 30 of the sensing line being exposed to the temperature in the region 30A.

The oscillator formed by the amplifier 14 and sensing line 15 is relatively well known in the fluidic art. Its operation is as follows:

Fluid under pressure is supplied through line 20 to the nozzle 18 to form a fluid beam directed toward the divider or splitter 23. In the absence of other forces the fluid beam would be equally divided, one-half flowing through output port 21 and the other half through output port 22. If, however, a condition occurs which will cause the beam to move to one side or the other of the splitter, the beam will lock on the surface 24 or 25 on the side where the greater portion of the beam is directed. By reason of this locking-on operation, a decrease in pressure will occur at the control port nearest the side to which the beam has become attached. As a result of this decrease in pressure, fluid flow into the opposite control port will take place, causing a wave of pressure to flow through the sensing line toward the first control port. This wave of pressure will impinge on the beam and cause it to swing to the opposite side of the chamber 17 where it will lock on the other side surface. This operation will be repeated as long as the inlet port 20 is supplied with fluid under pressure. The rate of oscillation or reversal of pulsation through the sensing line will depend upon the local speed of sound which is proportional to the square root of the local sense line temperature. The oscillator 14 thus produces or generates pulsating signals in the outlet ports 21 and 22 at a frequency bearing a predetermined relation to the temperature of the region surrounding the sensing line.

As previously pointed out in the objects, these pulsating signals are to be converted to differential pressure signals for ultimate use in driving some mechanism. To this end the pulsating signals issuing from the output ports 21 and 22 are supplied to lines 31 and 32. Line 31 is divided as at 33 into branches 34 and 35, which lead to predetermined control ports 36 and 37 of beam-type diode elements 38 and 40. Diode elements 38 and 40 are arranged in substantially duplicate parallel system segments which rectify, stabilize and amplify the control signals. The branches 34 and 35 of line 31 are of contrasting lengths represented by the coiled portions 41 and 42. By reason of the difference in length, the branch lines have different resonant amplitude characteristics, the lengths having been calculated to change the amplitude and cause the phase of frequency of the pulsating signals to be shifted relative to one another, as indicated by the solid and dotted line curves shown in FIG. 5.

Figure 3:
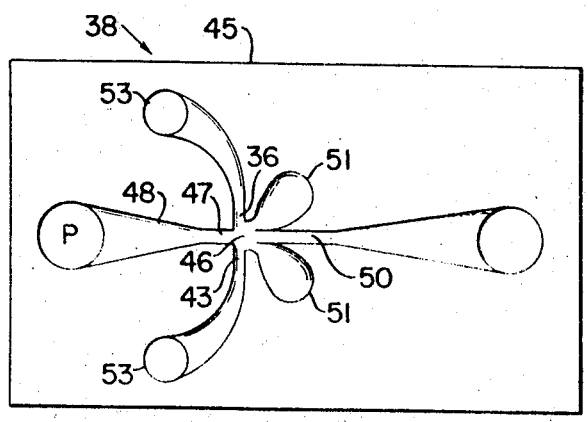
FIG. 3 is a similar view of a typical beam diode employed in the system of FIG. 1 to vary the amplitude of signals produced in the system.

Output line 32 leading from the oscillator extends to control ports 43 and 44 on the diode elements 38 and 40, respectively, control ports 36 and 43 being disposed in oppositely directed confronting relation in diode 38, and control ports 37 and 44 being similarly arranged in diode 40. To facilitate the understanding of the diodes, one of these elements has been symbolically shown on an enlarged scale in FIG. 3. Each of these diodes comprises a body 45 with a chamber 46 formed therein, a nozzle 47 communicating with the chamber at one side and with a source of pressure through an inlet port 48. Fluid under pressure from the source flows through inlet 48 to nozzle 47 and forms a jet beam in chamber 46, this beam being directed toward an output port 50. Vent ports 51 are arranged at either side of the output port 50 so that if the beam issuing from port 47 is deflected to one side or the other of the output port 50, varying portions of the beam will be vented, depending upon the degree of deflection of the beam. To effect movement of the beam to either side of the output port, control ports 36, 37, 43, and 44 on FIG. 1 are formed at either side of the nozzle 47. These control ports communicate with and receive fluid signals through inlets 53, such inlets receiving pulsating fluid signals through the resonator lines 41 or 42 and output line 32 depending upon which diode 38 or 40 is being considered. Output line 32 is provided with an adjustable restriction 54 to control the forces of pulsating signals supplied through output line 32 to control ports 43 and 44.

It will be seen from the foregoing that pulsating signals issuing from output port 21 through line 31 will be supplied to control ports 36 and 37, and applied to the beams of the respective diode elements to deflect such beams and, in part, cause the diode elements to produce signals of increased amplitude bearing a relation to the frequency of the original signals. The contrasting lengths of resonant lines 41 and 42 have been selected to change the amplitude and cause the phase of frequency of the pulsating signals to be shifted relative to one another, as indicated by the solid and dotted line curves shown in FIG. 5. Portions of the signals represented by the curves falling between lines A and B on FIG. 5 are utilized in the formation of the ultimate signals.

Figure 5:
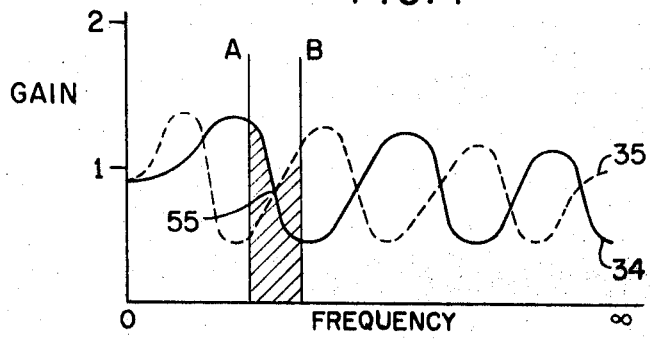
FIG. 5 is a graphic illustration of the resonant characteristics of fluid line in which the pulsating signals are treated in a part of the system of FIG. 1 to increase their usefulness.
Figure 6:
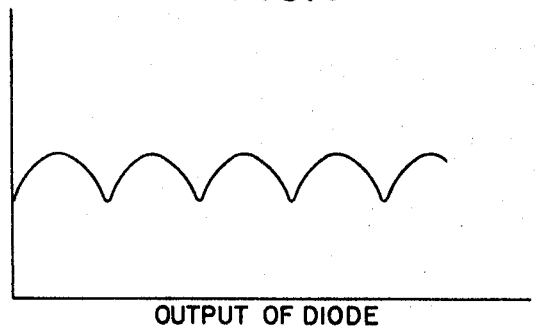
FIGS. 6 and 7 are similar views of the results of operation of other parts of the system of FIG. 1.
Figure 7:
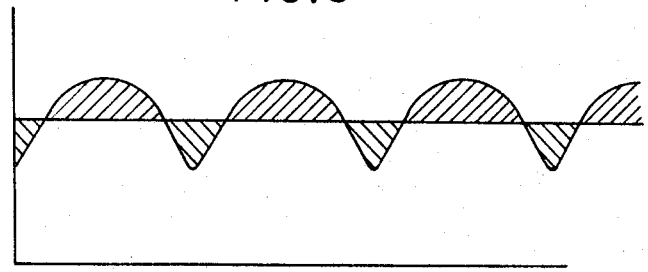

It will be noted from FIG. 5 that due to the shift in phase of the signal frequencies secured by the difference in length or resonance characteristics of lines 34 and 35, line 34 is tuned for decreasing resonance and line 35 is tuned for increasing resonance at the selected set point frequency (temperature) designated by the numeral 55.

The signal issuing from line 41 is applied to the beam in diode 38 and functions to deflect it toward one side of the output port 50. A signal from line 32 is applied to the opposite side of the beam through control port 43 to deflect the beam toward the opposite side of the output port to an extent depending upon the force of the signal as modified by the adjustable resistance 54 in line 32. The length of time the beam registers with and is received by the output port in addition to the pressure of the supply will determine the volume and pressure of fluid flowing from diode 38 through line 56 leading from output port 50 of such diode.

A similar operation occurs in the other portion of the system composed of line 42 and diode 40. This portion of the system is substantially the duplicate of the portion described in the preceding paragraph. The resonant characteristics of line 42 are selected to give a predetermined performance. The signal from line 42 is applied to the beam in diode 40 through control port 37 to deflect the beam toward one side of the output port 50 and the signal from line 32 is applied to the opposite side of the beam through control port 44 to deflect the beam in the opposite direction. As a result, line 57 leading from the output port 50 of diode 40 will issue a stream of fluid at a pressure and volume determined by the supply pressure and the length of time and the beam of such diode registers with the output port.

Figure 4:
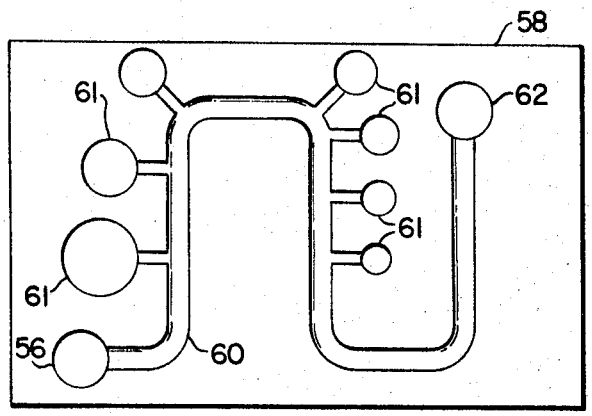
FIG. 4 is also a similar view of a typical resonant cavity type filter employed in the system of FIG. 1.

The lines 56 and 57 each contain a filter element 58, shown schematically on an enlarged scale in FIG. 4, to stabilize or smooth out the signals in the lines connected therewith. Each filter element 58 contains a passage 60 with a plurality of chambers 61 of varying sizes communicating therewith at points spaced along the passage. The chambers function on the order of capacitors by receiving any pressure surges and returning the fluid thus received to the lines as the pressure recedes. The flow in the passage is thus smoothed out or stabilized. Additional effect may be secured by providing one of the lines 56 or 57 with a variable restriction 57A.

Lines 62 and 63 extending from the filter elements 58 lead to opposed control ports of a substantially conventional fluid amplifier 64 which is utilized to increase the sensitivity of the signals. As many stages of amplification as are necessary to secure the desired results may be used.

It will be understood that a differential pressure which is a function of the temperature in region 30A exists in lines 62 and 63, and this differential will be utilized in amplifier 64 to produce a differential output in lines 65 and 66 leading from such amplifier. The output from amplifier 64 may be employed to operate any desired device such as the actuator 67 shown, for illustration purposes only, in FIG. 1.

From the foregoing it will be clear that a fluidic system has been provided which will monitor the temperature in a predetermined region, generating pulsating signals at a frequency bearing a desired relation to such temperature, shift the phase and modulate the amplitude of the pulsating signals, rectify the resulting signals to produce a differential pressure related to the temperature sensed, and amplify the differential pressure to increase the sensitivity of the final signals to perform a useful function.

I claim:
1. A fluidic characteristic sensing system, comprising:
 a. a first means responsive to change in a selected characteristic in a predetermined region to generate pulsating fluid pressure signals with a frequency which is a function of the selected characteristic;
 b. a second means connected with said first means, said second means having a pair of resonant transmission lines and a pair of beam diodes which receive such signals, shift the frequency phase, and convert the pulsating signals to a modulated pressure amplitude;
 c. a third means connected with said second means to receive the phase shifted amplitude modulated signals and rectify the same to produce fluid pressure signals of substantially uniform force; and
 d. a fourth means connected with said third means to receive signals issuing therefrom and amplify the same to secure desired sensitivity.

2. The fluidic characteristic sensing system of claim 1 in which filter means are connected with said beam diodes to receive the output therefrom and reduce the pulsations by converting the signals to the mean level of the pulsating pressures.

3. The fluidic characteristic sensing system of claim 2 in which beam amplifier means is connected with said filter means to receive and utilize the output therefrom to control the beam to produce output signals having a predetermined differential.

4. The fluidic characteristic sensing system of claim 1 in which each diode has means forming a chamber with an output port, an inlet at the opposite side of said chamber communicating with a source of fluid pressure and directing a jet beam toward said output port, a control port at each side of said inlet for directing a control jet against the side of said jet beam to deflect the same away from said output port, and said transmission lines are of contrasting length and lead from the first means to certain of the control ports of said diodes, and a transmission line with a variable restriction leads from the first means to the other control ports of said diodes.

5. The fluidic characteristic sensing system of claim 4 in which the third means comprises a separate filter element communicating with each output port of said diodes.

6. The fluidic characteristic sensing system of claim 5 in which a variable restriction is disposed between one of said diodes and the filter communicating therewith.

7. The fluidic characteristic sensing system of claim 5 in which each filter element comprises a passage with a plurality of resonant cavities of different capacities communicating therewith at spaced points.

8. A fluidic characteristic sensing system, comprising:
  a. a beam-type fluid amplifier having means forming a chamber with a pair of output ports at one side, an inlet at the opposite side communicating with a source of fluid pressure and directing a jet beam toward the output ports, and a control port at each side of said inlet for directing a control jet against the side of said jet beam to deflect it toward alternate output ports;
  b. a fluid passage connecting said control ports and exposed to a localized region in which a selected characteristic is to be sensed;
  c. a pair of diodes each with means forming a chamber with an output port, an inlet at the opposite side of said chamber communicating with a source of fluid pressure and directing a jet beam toward said output port, a control port at each side of said inlet for directing a control jet against the side of said jet beam to deflect the same away from said output port, predetermined control ports being connected with a certain output said amplifier by resonant transmission lines and the other control ports being connected with the remaining output port of the amplifier of said first means by a passage containing a variable restriction;
  d. a separate filter element communicating with the output port of each diode, each of said filter elements having a passage with a plurality of resonant cavities of different capacities communicating therewith at spaced points; and
  e. a fluid amplifier of the type having means forming a chamber with spaced output ports at one side and an inlet at the opposite side communicating with a source of fluid pressure and directing a jet beam toward said output ports, a control port at either side of said inlet for directing a control jet stream against the side of said jet beam to deflect it relative to said output ports, each control port communicating with the outlet of a different filter element, said amplifier serving to produce output signals with desired sensitivities.